March 14, 1933.　　　　J. F. MALM　　　　1,901,178
LIQUID DISPENSING METER
Filed Oct. 28, 1929　　　3 Sheets-Sheet 1

INVENTOR:
John F. Malm
By E. J. Andrews
Atty

March 14, 1933.  J. F. MALM  1,901,178
LIQUID DISPENSING METER
Filed Oct. 28, 1929   3 Sheets-Sheet 2

INVENTOR:
John F. Malm
By E. J. Andrews
Atty.

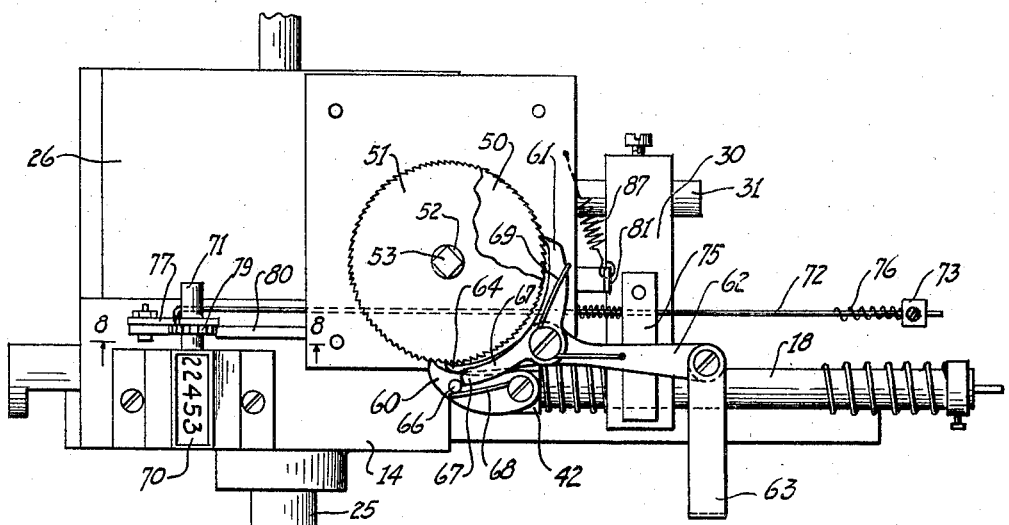

Patented Mar. 14, 1933

1,901,178

UNITED STATES PATENT OFFICE

JOHN F. MALM, OF CHICAGO, ILLINOIS, ASSIGNOR OF ONE-HALF TO FRANK A. ADKINS, OF CHICAGO, ILLINOIS

LIQUID DISPENSING METER

Application filed October 28, 1929. Serial No. 402,916.

This invention relates to liquid dispensing meters and it has for its object measuring and dispensing liquids, including substances which are sufficiently plastic to flow under reasonable pressures, such as grease and the like. It has for a particular object the dispensing and measuring of oils and greases when supplied in small quantities by filling stations supplying oils and grease for automobiles. While the meter may be used for all similar purposes and it is applicable to all of such substances as grease and other plastic substances, yet, for the purpose of illustrating the invention, reference will be had merely to supplying oil for automobile use. The basis of the invention is the dispensing and measurement of oil by volume, it being understood in general practice that a certain volume indicates a certain weight, depending upon the density of the liquid.

Figure 1:
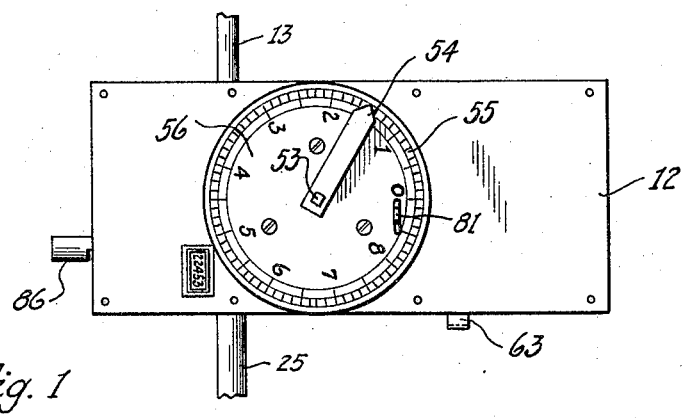
Figure 2:
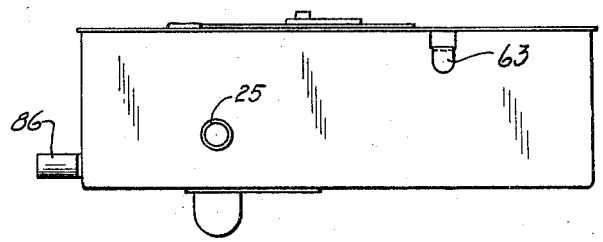
Figure 3:
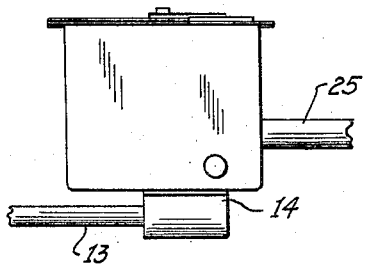
Figure 4:
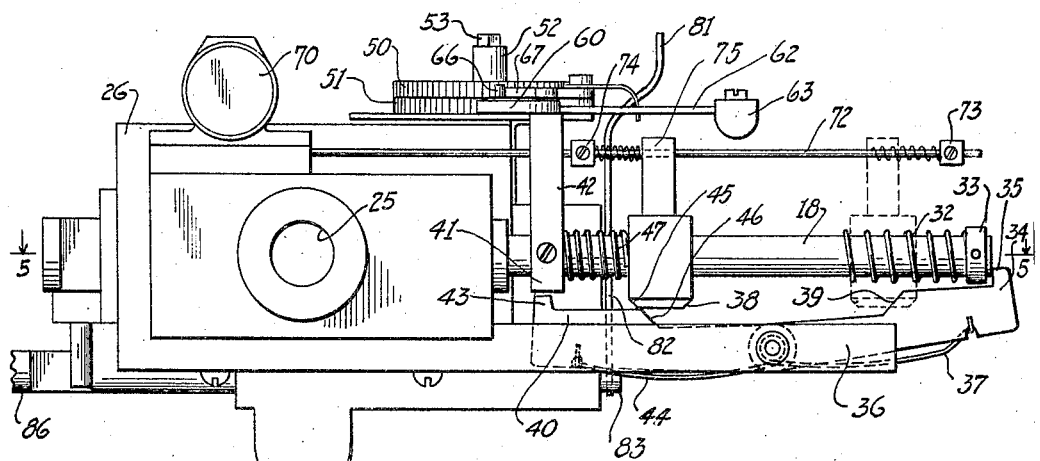
Figure 5:
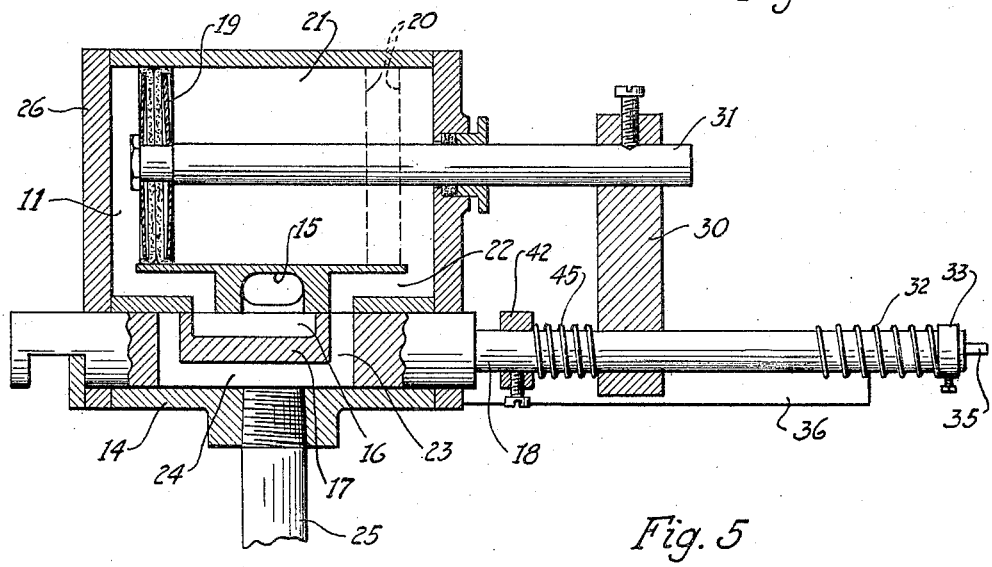

Of the accompanying drawings, Fig. 1 is a plan view of a meter which embodies the principles of my invention; Fig. 2 is an elevation thereof; Fig. 3 is an end elevation; Fig. 4 is an elevation of the internal mechanism, somewhat enlarged, with the casing removed; Fig. 5 is a sectional elevation along the line 5—5 of Fig. 4; Fig. 6 is a plan view of the mechanism; Fig. 7 is an end elevation thereof; Fig. 8 is a fractional sectional view along the line 8—8 of Fig. 6; and Fig. 9 is a fractional sectional view along the line 9—9 of Fig. 7.

The meter is adapted to be connected to any suitable source of oil under pressure, the pressure to be produced in any desired manner, such as by means of an ordinary oil pump operated either by hand or by a motor. The mechanism is enclosed in a casing 12, the oil entering the casing through a pipe 13 which is connected to a valve casing 14 and communicates with an inlet port 15, and the port 15, in turn, is connected to a chamber 16 in a valve 17. Valve 17 is to control the flow of liquid into and out of the chambers 11 and 21 of the cylinder 26. This valve is slidably mounted in the casing 14 and is operable by means of a valve stem 18.

The valve 84 in the casing 14 controls the flow of liquid from the inlet pipe 13 to the outlet port 15. When the valve 84 is in the position indicated by Fig. 9, the valve is closed, but when the valve is forced to the right, the oil is free to flow from the inlet pipe 13 into the valve casing 14, and the port 15 and the valve chamber 16, and into the cylinder chamber 11, when the valve 17 is in the position shown in Fig. 5. The pressure of the oil then forces the piston 19, which is slidably mounted in the cylinder 26, towards the other end of the cylinder and, when the piston is adjacent the other end of the cylinder, at the position indicated by the dotted lines 20, the valve 17 will be forced in a manner hereinafter described towards that end of the cylinder, and the operation of the mechanism will be reversed. In the meantime, the oil which is in the chamber 21 of the cylinder will be forced by the piston through the passageways 22 and 23 to the chamber 24 and then out of the outlet pipe 25. In fact, the process is somewhat similar to the flow of steam through an ordinary steam valve and cylinder to the exhaust port.

When the mechanism is reversed by the forcing of the valve 17 to the other end of the casing, the flow of oil will be reversed in a well-known manner. Hence, by each stroke of the piston, a volume of oil will be forced out equal to the capacity of that portion of the chamber of the cylinder through which the piston passes. And this oil normally will be passed through suitable pipes to the oil casing of the automobile or wherever it may be desired. Obviously, the volume of oil that is thus measured may be varied as desired but, for the purpose of describing my invention, we may assume that the volume is such that, with ordinary densities, the mass of oil delivered for each stroke of the piston will be one ounce. Hence, sixteen strokes of the piston, or eight cycles thereof, are required to deliver one pound of oil.

The mechanism which I prefer for operating the valve 17 comprises an arm 30 adjustably fixed to the stem 31 of the piston 19. As the piston is forced to the right (Fig. 5) by the oil, the arm 30 will be forced to the right against a compression spring 32 which is mounted on the valve stem 18 and acts against a collar 33 adjustably fixed to the valve stem. The valve stem, however, is normally locked in position by a latch 34 (Fig. 4) having a lug 35 normally extending over the collar 33 on the end of the valve stem 18. The latch is pivoted to a member 36, fixed to the cylinder, and a spring 37 holds the latch 34 in the locked position.

The valve stem end of the arm 30 carries a cam 38 which is arranged to coact with a cam surface 39 on the latch 34 and, when the piston 19 has reached the reversing position 20, the cams 38 and 39 coact to force the latch 34 away from the stem collar 33 and unlock the stem. As a consequence, the compressed spring 32 will then force the valve stem 18 to the right to its reversing position.

When this occurs, a latch 40 coacts with a shoulder 41 on the arm 42, also fixed to the valve stem 18, so that the plug 43 on the latch prevents movement of the stem 18 to the left, a spring 44 holding the latch 43 in the locked position. However, as the stem 18 moves to the left, a cam 45 coacts with a cam 46 on the latch 40 and, when the left-hand reversing position of the piston is reached, the valve stem is again unlatched, and the spring 47 forces the stem and the valve to the left-hand reversing position. In this manner, the measuring mechanism will be operated continuously, so long as the oil is maintained under suitable pressure and so long as the inlet port 15 is open. However, mechanism is provided for closing the inlet port 15 when the desired amount of oil has been delivered, so as to prevent the delivery of any more oil until that port is again open. The mechanism also comprises means to prevent any manual change by the operator in the meter-indicating mechanism except by the delivery of the proper amount of oil, and for indicating the amount of oil which is to be delivered, and also for setting the mechanism so that amount, and that amount only, will be delivered. The mechanism is as follows:

Rotatably mounted above the cylinder 26 is a pair of ratchet wheels 50 and 51. These wheels are fixed to a rotatably mounted axis 52. The axis 52 passes through the casing 12 of the mechanism and, on the outer end 53 of the axis, is mounted a pointer 54 (Fig. 1) which is adapted to coact with the scale 55 on a disk 56 mounted on the casing of the mechanism. In this instance, the scale is divided into eight main divisions, each division being divided into eight minor divisions. The mechanism is so arranged that the pointer 54 passes clockwise from one minor division to another at each cycle of the piston and, hence, as the amount of oil delivered at each stroke is in this case assumed to be one ounce, a pound of oil will be delivered when the pointer passes from one main division to another. Hence, the total capacity of the scale, as herein arranged, would be substantially eight pounds, as there are eight main divisions.

When the operation of the mechanism is stopped by closing the inlet valve as hereinafter described, the pointer registers with the zero main division, and the arrangement is such that the pointer may then be turned to the main division which indicates the number of pounds which it is desired to deliver. For instance, if four pounds are desired, the pointer is set at the point "4" and the mechanism will prevent the pointer from being turned clockwise, except by the operation of the piston as it delivers the oil and, when the pointer reaches the zero division, the inlet port will be closed.

The preferred mechanism for producing these results consists of the following: A pivotally mounted pawl 60 normally coacts with the lower ratchet wheel 51, and prevents the rotation of the axis 52 counter-clockwise, and the pivotally mounted pawl 61 coacting with the upper ratchet-wheel 50 normally prevents the rotation of the axis clockwise. So that, except when in operation, there can be no rotation of the axis 52, unless the pawls are released in the following manner:

In order to set the pointer at the proper division, the pawl 60 is released by pressing inwardly on an arm 62, by means of a link 63, or in any other suitable manner. Fixed to this arm 62 is another pawl 64 which is adapted to normally coact with the teeth of the ratchet wheel 51, also preventing counter-clockwise rotation; but, when the arm 62 is forced inwardly, the pawl 64 is forced out of coaction with the wheel 51 and, at the same time, the pawl 64 forces the pawl 60 out of coaction, the pawls 64 and 61 lying substantially in the same plane, with the pawl 64 between the pawl 61 and the wheel 51. The wheel 51 is then free to rotate counter-clockwise. The operator then rotates the pointer counter-clockwise to the proper division and releases the arm 62 locking the mechanism, so that then the pointer cannot be moved in either direction, except by the normal operation of the mechanism for measuring the oil, or by pushing inwardly the arm 62.

In operation, however, the pawl 61 which prevents clockwise motion is released in the following manner: The pawl 60 is mounted on the post 42, which is fixed to the valve stem 18 and, hence, when the stem moves to the right, the pawl 60 is carried to the right, and the pin 66, acting on an arm 67 which is fixed to the pawl 61, forces the arm 67 inwardly and the pawl 61 outwardly and, thus, releases the wheel 50. Although the pawl 60 is pivoted to the post 42, the spring 68 is sufficiently strong to overcome the spring 69 which controls the pawl 61 and, thus, to force the pawl 61 outwardly.

As the pawl 60 is moved to the right, the pawl 64 prevents any counter-clockwise rotation of the wheels, and the pawl 60, after releasing the pawl 61, is forced away from the wheel by riding on the back edge of the pawl 64; so that, as the piston stem is again forced to the left, carrying with it the pawl 60, this pawl, although its total movement is several teeth of the wheel, yet, its effective movement is only one tooth, as the pawl 64 prevents engagement sooner with the wheel.

It will thus be seen that, with each complete cycle of the piston, the axis 52 will be rotated clockwise the equivalent of one tooth of the wheel 51, and this will be the equivalent of one minor division on the scale, or the equivalent of two ounces of oil. Obviously, in order to deliver four pounds of oil, thirty-two cycles of the piston are necessary. Also it is impossible for the operator to deliver less than the indicated amount, except by operating the pointer 54 clockwise when the pawl 61 is temporarily released automatically by the mechanism, and any such tampering would be readily seen by the customer.

Means are provided for registering the amount of oil that has been delivered. These means comprise any suitable counter 70, which is operated by means of a spindle 71. The spindle, as is common, registers one additional unit for each rotation. But, in order to register one pound for each rotation, I provide means for eight complete reciprocations or cycles of the piston for each rotation of the spindle. These means comprise a slidably mounted rod 72 which has a stop 73 at its outer end and a stop 74 on its central portion, and this rod is arranged to be operated by means of a post 75 fixed with reference to the stem 18. In this instance, the post is fixed to the arm 30.

In operation, as the piston stem 18 is forced outwardly, the post 75 compresses the spring 76 against the stop 73 and forces the rod 72 to the right and this, in turn, operates a member 77 rotatably mounted on the spindle 71, carrying with it a pawl 78 which is arranged to coact with the ratchet wheel 79 fixed to the spindle 71. A pawl 80 prevents backward rotation of the wheel 79 and, when the piston moves to the left, the rod 72 forces the pawl and also the wheel 79 clockwise (Fig. 8) the equivalent of one-eighth of a turn of the spindle, so that, when eight complete reciprocations or cycles of the piston have been made, the counter will indicate one more unit.

When the meter has delivered the full amount of oil desired, the pointer 54 ordinarily points to the zero division of the scale and, as the pointer reaches this division, it closes the inlet port 15. This is accomplished in the following manner: The pointer strikes against an arm 81 which projects through the scale disk 56. The arm 81 is pivotally associated with the cylinder 26 (Fig. 7), and a second arm 82 is fixed to the arm 81. The arm 82 coacts with a valve stem 83 which carries the valve 84 arranged to open and close the inlet 15. Normally, the free end of the arm 82 is held, by means of a spring 87, in a notch 88 in the valve stem, thus locking the valve in its open position.

But, when the arm 81 is operated by the pointer 54, the arm 82 is forced out of the notch 88 of the stem 83, and this releases the stem so that the spring 85 forces the stem and the valve 84 to the left and, thus, closes the inlet 15. When so closed, it is impossible for any more oil to be forced into the meter, and the flow thereof ceases. This closing of the inlet 15 prevents any undue pressure on the interior of the cylinder which might injure the apparatus. When the pointer has been set for further delivery of the oil, the operator forces inwardly the stem 83 by means of the projecting end 86, thus compressing the spring 85 and allowing the arm 82 to again enter the notch 88 of the stem and prevent outward movement thereof.

Although I have herein, in describing my invention, referred with considerable detail to the mechanism preferred for carrying out the invention, yet, modifications of the mechanism could be made by those skilled in the art, without departing from the spirit of my invention as disclosed by the following claims; and the term "oil" or "liquid" used herein, and particularly in the claims, is to be understood as including liquids of any viscosity, if sufficiently plastic to flow under reasonable pressures.

I claim as my invention:

1. A liquid dispensing meter comprising a reciprocating measuring means, indicating means, means operatively connecting said measuring and indicating means, said indicating and operating means comprising a toothed wheel, a pawl normally coacting with said wheel for rotating it in one direction, means for locking said wheel against rotation in said direction, and means operated by said reciprocating means for reciprocating said pawl with reference to the teeth of said wheel and for unlocking said locking means and rotating said wheel.

2. A liquid dispensing meter as claimed in claim 1, including a pawl for preventing rotation of said wheel in the opposite direction, and means operated by said reciprocating means for removing said first-mentioned pawl from coaction with said wheel during a part of the movement of said latter pawl.

3. A liquid dispensing meter comprising a cylinder, a piston mounted in said cylinder and having a piston stem, a slide valve casing, a valve in said casing for admitting a liquid under pressure into and out of said cylinder and reciprocating said piston, said valve having a valve stem, an arm fixed to said piston stem, the free end of said arm being slidably mounted on said valve stem, a stop on said valve stem on each side of said arm, and a spring encircling said valve stem between each of said stops and said arm, said valve casing having an inlet adapted to receive a liquid under pressure.

4. A liquid dispensing meter as claimed in claim 3, including a valve in said inlet, indicating means, and means operatively connecting said indicating means with said inlet valve for closing the inlet valve.

5. A liquid dispensing meter comprising manually adjustable means for indicating and predetermining the amount of liquid to be dispensed, means for dispensing said predetermined amounts of liquid, means operatively connecting said indicating means and said dispensing means, and means for locking said indicating means in its adjusted position, said measuring means comprising a reciprocating member, and said reciprocating member being arranged to unlock said locking means when said member moves in one direction only.

In testimony whereof, I hereunto set my hand.

JOHN F. MALM.